(12) United States Patent
Fiebiger

(10) Patent No.: US 8,090,474 B2
(45) Date of Patent: Jan. 3, 2012

(54) APPARATUS FOR CONTROLLING AT LEAST ONE MACHINE

(75) Inventor: Bernd Fiebiger, Bobingen (DE)

(73) Assignee: KUKA Laboratories GmbH, Augsburg (DE)

( * ) Notice: Subject to any disclaimer, the term of this patent is extended or adjusted under 35 U.S.C. 154(b) by 678 days.

(21) Appl. No.: 12/094,855

(22) PCT Filed: Dec. 20, 2006

(86) PCT No.: PCT/EP2006/012345
§ 371 (c)(1),
(2), (4) Date: Oct. 24, 2008

(87) PCT Pub. No.: WO2007/076939
PCT Pub. Date: Jul. 12, 2007

(65) Prior Publication Data
US 2009/0228120 A1    Sep. 10, 2009

(30) Foreign Application Priority Data
Jan. 3, 2006    (DE) .................. 10 2006 000 635

(51) Int. Cl.
*G06F 19/00*    (2006.01)
(52) U.S. Cl. .............. 700/245; 700/21; 700/63; 700/79; 700/83; 700/246; 318/563; 318/565; 318/567; 318/568.15; 318/568.11; 901/3; 901/22; 901/23; 901/43; 901/45; 701/23; 414/730; 104/53
(58) Field of Classification Search ............ 700/21, 700/63, 79, 83, 245, 246, 247, 248, 249, 700/255, 256, 258, 259, 264; 318/563, 565, 318/567, 568.1, 568.11, 568.12, 568.13, 318/568.15, 568.16, 568.18, 568.2, 568.21, 569; 901/3, 22, 23, 43, 45, 47, 49, 50; 701/23; 414/730; 104/53, 500
See application file for complete search history.

(56) References Cited

U.S. PATENT DOCUMENTS

| | | | | |
|---|---|---|---|---|
| 6,438,455 B2 * | 8/2002 | Matsumoto | .................... | 700/245 |
| 6,459,956 B2 * | 10/2002 | Matsumoto | .................... | 700/245 |
| 6,778,867 B1 * | 8/2004 | Ziegler et al. | .................... | 700/79 |
| 7,054,791 B2 * | 5/2006 | Kroth | ............................ | 702/188 |
| 7,076,311 B2 * | 7/2006 | Schuster | ......................... | 700/21 |

(Continued)

FOREIGN PATENT DOCUMENTS
EP    0 264 350 A1    4/1988
(Continued)

OTHER PUBLICATIONS

European Patent Office, Search Report in International Patent Application No. PCT/EP2006/012345 dated Aug. 31, 2007.

(Continued)

*Primary Examiner* — James Trammell
*Assistant Examiner* — McDieunel Marc
(74) *Attorney, Agent, or Firm* — Wood, Herron & Evans, LLP

(57) ABSTRACT

An apparatus and a method for controlling at least one machine, such as an industrial robot, having drives, safety peripheral components and a controller for a machine, and also having a safety controller. In this arrangement, the safety controller has superordinate access over the respective machine controller both to the machine drives and to the safety peripherals. This achieves the most easily configurable integration of the safety control loop into the operating control loops.

17 Claims, 3 Drawing Sheets

U.S. PATENT DOCUMENTS

Figure 1:
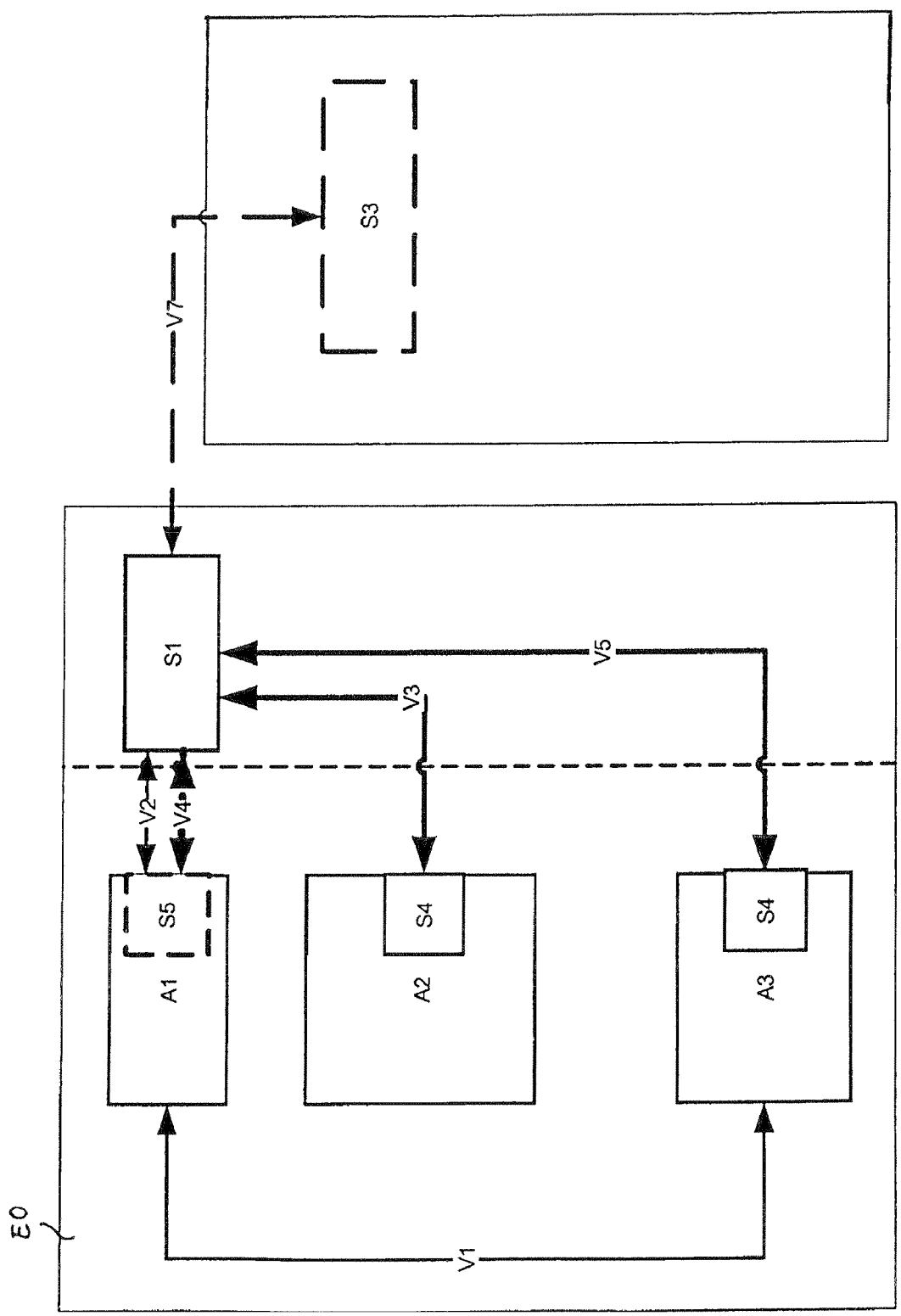

| | | | |
|---|---|---|---|
| 7,177,724 B2 * | 2/2007 | Cantello et al. | 700/264 |
| 7,376,488 B2 * | 5/2008 | Watanabe et al. | 700/264 |
| 7,590,468 B2 * | 9/2009 | Watanabe et al. | 700/259 |
| 7,610,119 B2 * | 10/2009 | Abe et al. | 701/1 |
| RE42,017 E * | 12/2010 | Schuster | 700/21 |
| 7,967,543 B2 * | 6/2011 | Criswell et al. | 414/373 |
| 2003/0050735 A1 | 3/2003 | Griffis | |
| 2005/0010332 A1 * | 1/2005 | Abe et al. | 700/245 |
| 2008/0231221 A1 * | 9/2008 | Ogawa | 318/568.12 |
| 2009/0110525 A1 * | 4/2009 | Criswell et al. | 414/507 |

FOREIGN PATENT DOCUMENTS

| | | |
|---|---|---|
| JP | 2001-525263 A | 12/2001 |
| JP | 2005-0252260 | 1/2005 |
| WO | 03/001307 A1 | 1/2003 |

OTHER PUBLICATIONS

Japanese Patent Office; Office Action in Japanese Patent Application No. 547883/2008 dated Jul. 6, 2011; 5 pages.

* cited by examiner

APPARATUS FOR CONTROLLING AT LEAST ONE MACHINE

The invention relates to an apparatus for controlling at least one machine which is actuated through a drive system, such as an industrial robot, having in each case a machine controller which is connected to the drive system through a first connecting device, and having safety peripheral components which are connected to a safety controller through a first secure connecting device. The invention also relates to a method for controlling at least one machine which is actuated through a drive system, such as an industrial robot, having in each case a robot controller, a safety controller and safety peripheral components.

Safety devices have the function of reducing dangers that arise during the operation of technical equipment to a minimum level. A standardization of such a minimum level is provided for example by European standard EN 954-1, in which safety components are classified in safety categories from 1 to 4 with increasing operational safety. The invention relates in particular to protective components and functions that fulfill at least safety category 3, i.e., that ensure at least single-fault safety.

An example of a safe component of this sort is a safety bus, which produces a secure connection between two components. The term "safe" is used in connection with drive functions for a method that, in the event of a fault, fulfills the requirements of a risk analysis category according to the standard EN 954-1. This definition of "safe" is applicable to all components belonging to an automation solution, i.e., including "technology," "controllers," "connections" and "inputs/outputs."

To ensure a reliable process sequence during the operation of a technical system, safety monitoring of the operational control is necessary, and possibly safety intervention into the operational sequence. This usually involves the use of a safety control loop which is separate from the operating control loop, with the two control loops being linked at safety-relevant points. As an example, an Emergency Off switch can be integrated into the safety control loop; when it is operated, a reliable stoppage of the drive of the technical system is forced, normally by switching a protective element into the power supply.

If the technical system includes a plurality of machines that act independently of each other, such as robots, when a safety problem occurs in one machine a reliable stoppage of the entire system is not desirable. On the other hand, if a plurality of machines are acting as an integrated group, the failure of one machine can also create a safety risk for other machines, for example adjacent ones.

To correct this problem, operating control loops and safety control loops are known that are superordinate to the entire facility, and which after a safety event assign machines whose safety is at risk to a safety function by way of logical links or algorithms and transfer them to a safety operating mode, while non-endangered machines remain in normal operation. Such systems which are superordinate to the entire facility are attuned precisely to the safety needs of the particular facility, which leads to a circuit logic that is relatively complex but is also rigidly matched to the individual components. With even a slight change in the facility, for example a modified arrangement of individual machines, the existing safety system may possibly no longer be adequate. For this reason, in particular in the case of industrial robots that work in an integrated group, a more flexible and easily configurable safety system is desirable, since here the function of the individual robots can vary over a short time period or additional robots can be utilized.

However, when a plurality of robots work together in an integrated group, the overall system generally lacks functional reliability, since for example an error in the function of one robot can give rise to new sources of errors for the remaining robots of the integrated group. These are not foreseen in the safety requirements of the individual robot, nor are they foreseeable, in particular because of the many degrees of freedom of such a system of robots, such as for example the number, function and location of the individual robots.

In the case of one safety controller known from practice according to the existing art, a robot controller, safety peripheral components and a drive system are assigned to a robot. Between the robot controller and the drive system, there is a connection through which the propulsion data can be exchanged. Between the safety peripheral components and the drive system there is necessarily a prescribed connecting device, which is designed with reliable technology. The safety peripheral components are connected through secure inputs and outputs to an external safety controller which is situated separately from it. Because of the rigidly prescribed secure connection between the safety peripheral components and the drive system, the safety-relevant properties are predefined and cannot simply be modified or adapted to individual configurations. The safety controller can act upon the drive system only in a roundabout way, through the safety peripheral components.

The object of the invention is to create an apparatus and a method for the safety control of a machine or an integrated group of a plurality of machines, in particular industrial robots, which enables in particular a flexible and easily configurable adaptation to varying safety requirements while avoiding the forenamed disadvantages.

This problem is solved according to the invention with an apparatus of the type named at the beginning, by connecting the safety peripheral components to the drive system through the safety controller. To solve the problem, a method conforming to the genre provides that safety-relevant events are detected by means of the safety peripheral components; the events detected by the safety peripheral components are transmitted to the safety controller as signals; the safety controller evaluates the signals and, depending on the evaluation, forwards safety-related control signals directly to the drive system.

Accordingly, a preferred design according to the method provides that the safety controller forwards the safety-related control signals directly to the drive system, bypassing the safety peripheral components; this preferably takes place through a secure input and output interface.

The invention converts the former rigid connection between (internal) safety peripheral components and drive system into a freely definable connection through the additional safety controller, so that safety-relevant information and data that are exchanged between the safety peripheral components and the drive system pass through the safety controller and can be evaluated and influenced by the latter.

The connecting devices are realized in particular as secure connections, normally by means of bus systems; however in principle they can also be designed in other ways, in particular as non-secure connecting devices through other wiring, or even wireless.

Along with the respective individually designed machine controller, the safety controller also has access both to the respective machine drives and to the safety peripheral components of the individual machines, and thus to the safety functions realized in the safety peripheral components. According to the invention, a functional separation is thereby achieved between the intrinsic safety of individual machines and a superordinate system safety. The standardized safety functions can include reliable stopping, more reliable deceleration, reliable moving at reduced speed and/or reliable assumption of an absolute position, with or without external operation of an enabling switch. In addition, some of the safety functions named earlier, or others, can also be defined logically in the safety controller itself and can be executable directly by accessing the respective machine drives. According to the invention, these can contribute both to increasing the intrinsic safety of individual machines and to the safety of the system.

The safety controller has superordinate access over the controller(s) of the respective machine(s) to the respective safety components and drives. This is the only way to achieve reliable operation of the total system. In this way the safety controller can access the safety functions of one, more than one or all of the machines connected with the safety controller, depending on need. This introduction of such a safety hierarchy according to the invention results in integration of the safety functions in close proximity to the respective sources of danger, which enables adaptation of the safety controller to system changes with maximum simplicity.

The actuation of the respective safety peripheral components and drives by the safety controller takes place via secure connections. To this end, connections of the safety controller can be hard-wired to the safety peripheral components and to the drives of the respective machine; to guarantee reliability this wiring must be at least of multiple-channel design. These connections must also be securely connected to the safety controller itself; this can be realized for example by means of a secure field bus.

To the extent that the connection between the safety controller and the respective safety peripheral components or drives is accomplished via secure bus systems, a safety standard is achieved in a simple way and the cost of cabling is minimized. The actuation of the safety peripheral components and drives by means of secure buses must take place through secure interfaces.

A preferred design of the apparatus according to the invention provides that the safety peripheral components are connected to the robot controller through the safety controller.

A preferred refinement provides that the safety peripheral components are connected to both the drive system and the robot controller exclusively through the safety controller. It can also be provided that the connection between drive system and safety controller take place through a second secure connecting device, where in particular the first secure connecting device and the second secure connection are executed with redundant hard wiring and/or the first secure connecting device and the second secure connecting device are routed via secure interfaces.

Preferably, the robot controller is connected to the safety controller over a different communication path. Data needed for configuration or for error diagnosis can be exchanged over this path. If safety-relevant data are involved, the second communication path should also be executed as a secure connection, such as a secure field bus. The safety controllers can be integrated spatially into the control cabinet of the robot controller, or alternately can be placed outside of the control cabinet as free-standing components.

The named secure bus connections are expandable according to the invention in order to create connections to the safety controller for additional safety-relevant components, such as Emergency Off switches, enabling switches, light barriers, etc. The advantages of the invention come into play here as well: Any technical facility with for example only one machine can be equipped with any safety provisions, and the safety logic of the facility can be adapted separately from the machine controller and the safety peripherals actuated by the latter. Thus according to the invention safety-relevant control devices can be uncoupled from the actual safety peripherals of the individual machine(s).

Furthermore, it can also be provided that the safety controllers are connected through an additional secure connecting device to a superordinate cellular safety controller. A preferred refinement provides that the safety controller is of freely programmable design, with the safety controller in particular having non-physical functional components to control the respective safety functions, configurable depending on the arrangement, function and number of machines.

A PLC (programmable logic controller) of this sort offers the advantage of adapting the existing safety system to new safety components and new safety requirements as simply and cost-effectively as possible by means of a user program provided therein. At the same time, according to the invention new safety functions can also be realized for the respective machine(s) by means of new program modules that are not provided in the existing safety peripheral components, and thus the operating reliability can be increased. However, for reasons of safety these modules should be located in an operating program that is separate from the user program and is not accessible to the user.

A refinement of the method according to the invention provides, in particular when multiple machines are used, such as robots, that a superordinate cellular safety controller sends additional safety-relevant signals to the safety controllers of multiple machines, with the safety-relevant signals of the safety controller being handled with priority over other controllers, in particular a superordinate cellular safety controller, by the robot controllers, the safety peripheral components and/or the drive system of the respective machine, to introduce a reliable state.

Figure 2:
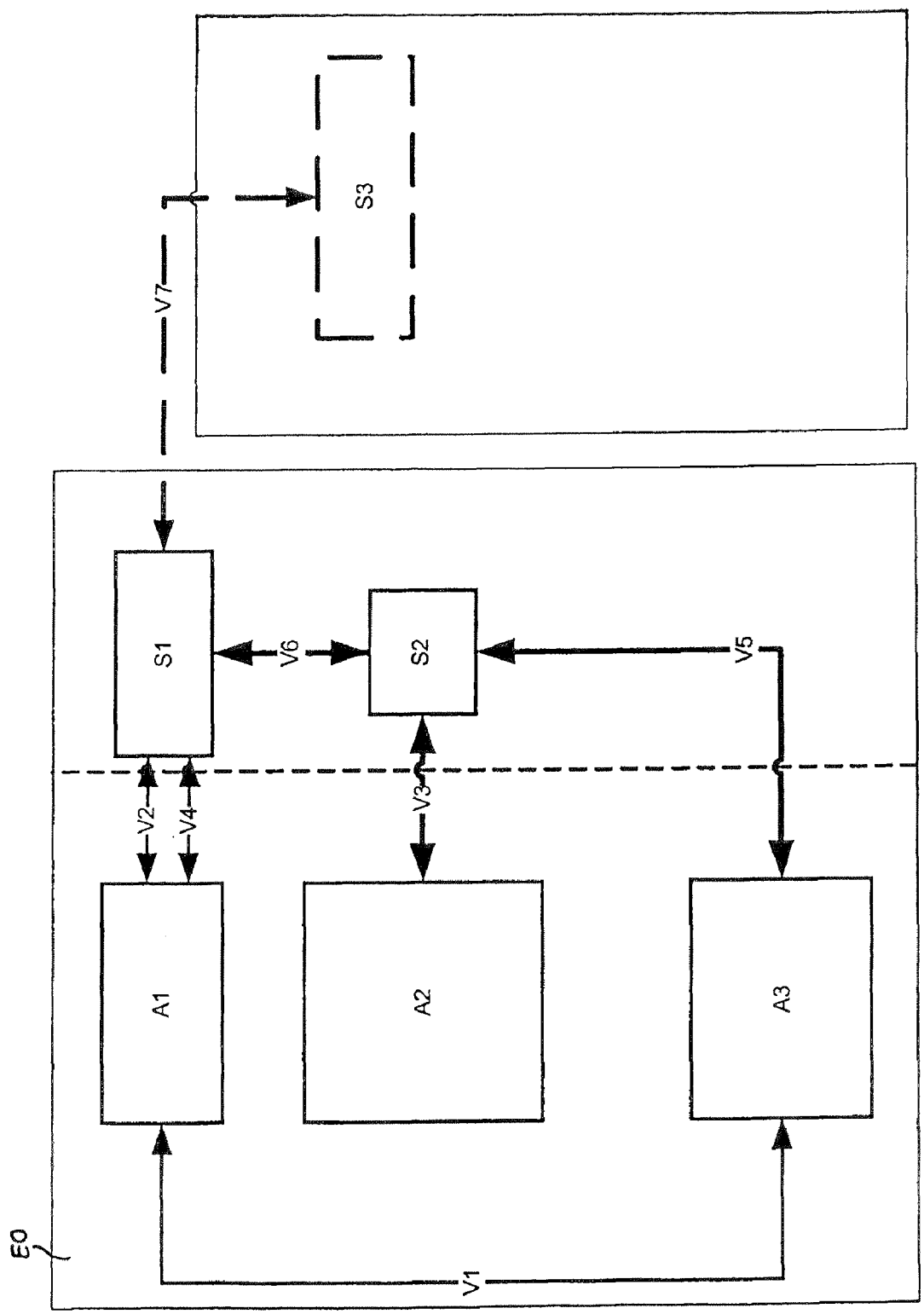
Figure 3:
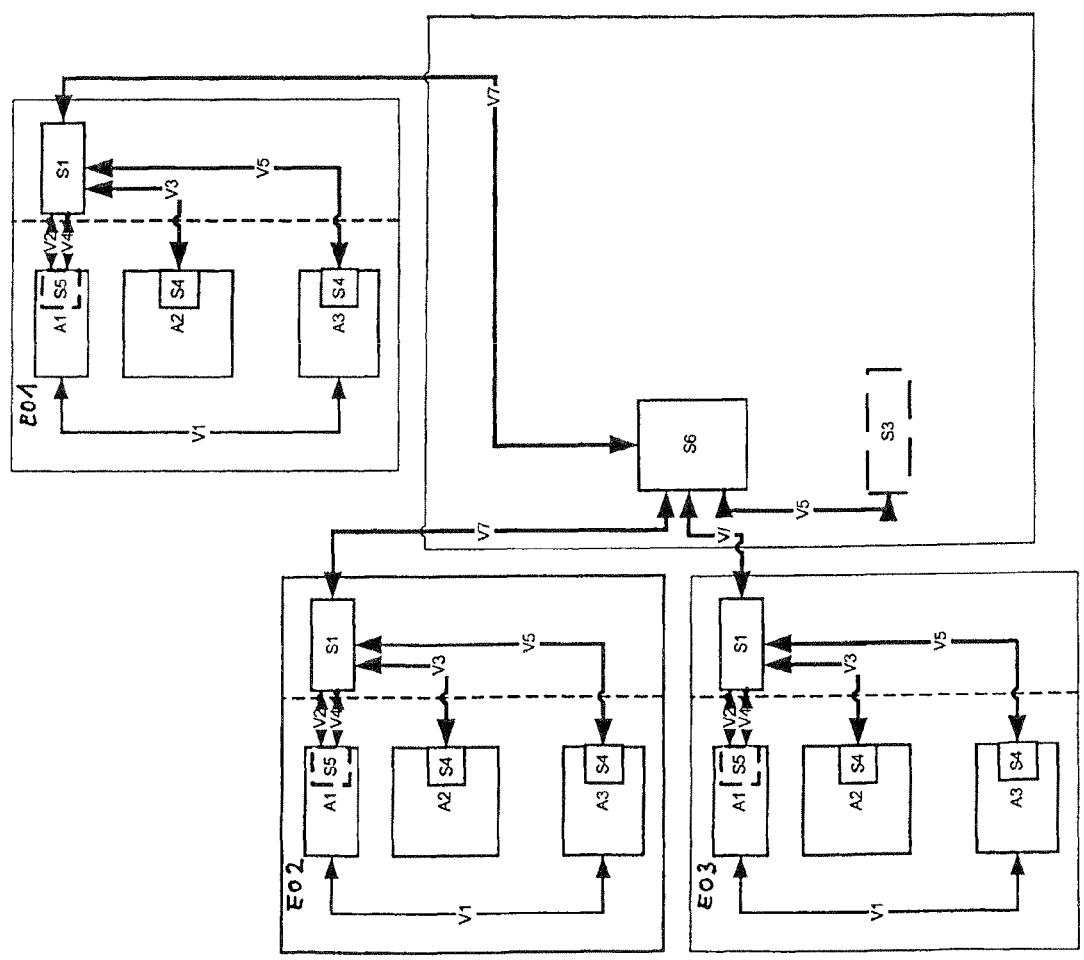

The invention will now be explained in greater detail on the basis of preferred exemplary embodiments, with reference to the drawings. The figures show the following:

FIG. 1: a block diagram of a first variant of an apparatus according to the invention, with reliable wiring between the safety controller and the safety peripheral components, the drives and optionally the robot controller of a robot;

FIG. 2: a block diagram of a second variant of an apparatus according to the invention, with a connection between the safety controller and the safety peripheral components, the drives and optionally the robot controller by means of reliable bus systems;

FIG. 3: a block diagram of a plurality of apparatuses according to the invention, with a superordinate cellular safety controller.

FIG. 1 shows a block diagram of a first variant of an apparatus according to the invention, having secure wiring between a safety controller S1 and safety peripheral components A2, drives A3 and optionally a robot controller A1 of a robot. According to the invention, a preferably freely configurable safety controller S1 is either integrated into the control cabinet EO of the robot or is connectable to the latter independently. Safety controller S1 is connected to the safety peripheral components A2 through a first hard-wired secure connecting device V3. In addition, safety controller S1 is connected to the drive system A3 by way of a second hard-wired secure connecting device V5. There is no direct secure connection between the safety peripheral components A2 and the drive system A3; preferably this connection can even be dispensed with entirety. Additionally, the safety controller S1 can be connected to robot controller A1 through either a secure connecting device V4 or a non-secure connecting device V2. To actuate the robot, a connecting device V1 between robot controller A1 and drive system A3 is also necessary. This connection V1 can be executed using non-secure technology, however. The depicted direct connection of the safety peripheral components A2 to the safety controller S1 through the secure connecting device V3 could be replaced by an additional secure connecting device between the robot controller A1 and the safety peripheral components A2. In this case it is necessary for the safety controller S1 and the robot controller A1 to be connected through the secure connecting device V4. That creates an indirect connection between the safety controller S1 and the safety peripheral component A2 through the robot controller A1, and the secure connecting device V5 can be eliminated.

FIG. 2 shows a block diagram of a second variant of an apparatus according to the invention, with a connection between the safety controller S1 and the safety peripheral components A2, the drive system A3 and optionally the robot controller A1 by means of connecting devices V2, V3, V5 in the form of secure bus systems. Safety controller S1 is connected to a secure input and output interface S2 through a secure connecting device V6. Secure input and output interface S2 in turn couples the safety peripheral components A2 and the drive system A3 with the safety controller S1. The safety peripheral components A2 are joined to the secure input and output interface S2 through the first secure connecting device V3. The drive system A3 is joined to the secure input and output interface S2 through the second secure connecting device V5. In this variant as well, there is no longer any direct secure connection between the safety peripheral components A2 and the drive system A3; preferably this connection can even be dispensed with entirety. Additionally, the safety controller S1 can again be connected to robot controller A1 through either a secure connecting device V4 or a non-secure connecting device V2. To actuate the robot, a connecting device V1 between robot controller A1 and drive system A3 is also necessary. This connecting device V1 can be executed using non-secure technology, however. The depicted connection of the safety peripheral components A2 with the safety controller through the secure input and output interface S2 by means of the secure connecting devices V3 and V6 could be replaced by an additional secure connecting device between the robot controller A1 and the safety peripheral components A2. In this case it is necessary for the safety controller S1 and the robot controller A1 to be connected through the secure connection V4. That creates an indirect connection between the safety controller S1 and the safety peripheral component A2 through the robot controller A1, and the secure connecting devices V3 and V6 can be eliminated.

FIG. 3 shows a block diagram of a plurality of apparatuses according to the invention, with a superordinate cellular safety controller. In the depicted example, three robots are joined to a common cellular safety controller S6. The robot controller units E01 through E03 are portrayed in FIG. 3 using the example of the variant from FIG. 1. By analogy, the robot controller units E01 through E03 can also be designed according to the second variant from FIG. 2. Of course, robot controller units according to the variant from FIG. 1 can also be combined with robot controller units according to the variant from FIG. 2 in any way desired. Each robot controller unit E01 through E03 communicates with the superordinate cellular safety controller S6 through its own secure connecting devices V7.

In all variants according to the invention, not only in those depicted as exemplary embodiments, to create superordinate system security the safety controller S1 according to the invention has a safety component that is freely configurable in a preferred version, in order to enable simple and inexpensive adaptation to the particular safety requirements of the system. For example, it can have non-physical functional segments as freely programmable modules.

Because of the secure communication path with the safety peripheral components A2 of the robot provided according to the invention, realized by means of the connecting device V3, safety controller S1 has access to the respective safety functions. Furthermore, other safety functions can also be anchored in the safety peripheral component A2 of safety controller S1 via the secure communication path with the drive unit A3 of the robot formed by the connecting device. These can be present in the form of programmable program modules, which should be inaccessible for the user for reasons of safety.

The secure bus connecting devices V3 and V5 of safety controller S1 are expandable as desired, in order to create a reliable communication path for inputs or outputs of additional safety components S3. These may be switches or sensors for triggering a safety function, such as Emergency Off switches, enabling switches, light barriers or a safety gate.

In another preferred embodiment of the invention, another communication path V2 is provided between the robot controller A1 of the robot and the safety controller S1. Thus an exchange of operating data between these two components is also made possible. If safety-relevant data are involved, this should be a secure connecting device V4, such as a safety bus for example.

The embodiments of the invention shown in FIG. 1 and FIG. 2 serve to control only one robot, representing any number of robots in other preferred embodiments of the invention, as depicted in FIG. 3. It goes without saying that the advantages of the invention become evident especially in the case of a relatively large number of robots working in an integrated group, or when an integrated group of robots is to be enlarged or arranged differently, which causes the safety requirements of the system to be changed. In a preferred embodiment with a plurality of robots, the connection between the individual components of the respective robots with the corresponding safety controllers S1 is made in the same way as that shown in FIG. 1 or FIG. 2.

REFERENCE LABELS

A1 robot controller
A2 safety peripheral component
A3 drive system
E01-E03 robot controller units
S1 safety controller
S2 input and output interface
S3 safety components
V1-V7 connecting device

The invention claimed is:
1. An apparatus for controlling at least one machine, comprising:
   a drive system for actuating the machine;
   a robot controller operatively connected to said drive system through a first connecting device;
   a safety controller operatively connected to said drive system; and
   a plurality of safety peripheral components operatively connected to said safety controller through a first secure connecting device and operatively connected to said drive system only through said safety controller;

said safety peripheral components sensing one or more safety parameters and generating signals associated with the respective parameters;

said safety controller receiving said signals and controlling said drive system in response thereto.

2. The apparatus of claim 1, wherein said safety peripheral components are operatively connected to said robot controller through said safety controller.

3. The apparatus of claim 1, wherein:
said safety controller is operatively connected to said drive system through a second secure connecting device.

4. The apparatus of claim 3, wherein at least one of said first or second secure connecting devices includes redundant hard wiring.

5. The apparatus of claim 3, wherein at least one of said first or second secure connecting devices includes a secure input/output interface.

6. The apparatus of claim 1, further comprising:
a communication path operatively connecting said robot controller to said safety controller.

7. The apparatus of claim 6, wherein said communication path includes a secure connection.

8. The apparatus of claim 6, further comprising:
a second secure connecting device operatively connecting said drive system to said safety controller; and
wherein said first connecting device is routed via at least one of said second secure connection or said communication path.

9. The apparatus of claim 1, further comprising:
a superordinate cellular safety controller; and
an additional secure connecting device operatively connecting said superordinate cellular safety controller to said safety controller.

10. The apparatus of claim 1, wherein said safety controller is freely programmable.

11. The apparatus of claim 10, wherein said safety controller includes preconfigured non-physical functional components selectable based on the arrangement, function, or number of the machines, said non-physical functional components being activatable for controlling a particular safety function.

12. An apparatus for controlling at least one machine, comprising:
a drive system for actuating the machine;
a robot controller operatively connected to said drive system through a first connecting device;
a safety controller operatively connected to said drive system; and
a plurality of safety peripheral components operatively connected to said safety controller through a first secure connecting device and operatively connected to said drive system through said safety controller;
wherein said safety peripheral components are operatively connected to said drive system and said robot controller exclusively through said safety controller.

13. A method of controlling at least one machine, the method comprising:
detecting a safety-relevant event using a safety peripheral component operatively coupled with the machine only through a safety controller;
transmitting a signal associated with the detection of the safety-relevant event to the safety controller;
evaluating the signal using the safety controller; and
sending a safety-related control signal to a drive system coupled to the machine in response to the evaluation.

14. The method of claim 13, wherein sending the safety-related control signal to the drive system comprises bypassing safety peripheral components.

15. The method of claim 14, further comprising:
sending the safety-related control signal to the drive system via a secure input and output interface.

16. The method of claim 14, further comprising:
prioritizing safety-relevant signals received from the safety controller over the additional safety-relevant signals.

17. The method of claim 13, further comprising:
sending additional safety-relevant signals to respective safety controllers associated with a plurality of robots.

* * * * *